US012386837B2

(12) United States Patent
Sharma et al.

(10) Patent No.: US 12,386,837 B2
(45) Date of Patent: Aug. 12, 2025

(54) MEMORY GRAPH QUERY ENGINE WITH PERSISTED STORAGE

(71) Applicant: Microsoft Technology Licensing, LLC, Redmond, WA (US)

(72) Inventors: Manish Sharma, Gurugram (IN); Oliver Drew Leonard Towers, Seattle, WA (US); Jayanta Mondal, Seattle, WA (US); Siddhesh Dilip Vethe, Redmond, WA (US); John Robert Pao, Bozeman, MN (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/799,958

(22) Filed: Aug. 9, 2024

(65) Prior Publication Data

US 2024/0403299 A1 Dec. 5, 2024

Related U.S. Application Data

(63) Continuation of application No. 17/814,774, filed on Jul. 25, 2022, now Pat. No. 12,086,139.

(51) Int. Cl.
*G06F 16/2455* (2019.01)
*G06F 16/22* (2019.01)
*G06F 16/25* (2019.01)

(52) U.S. Cl.
CPC ...... *G06F 16/2455* (2019.01); *G06F 16/2264* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 11,620,311 B1 * | 4/2023 | Kumar | G06F 16/283 707/602 |
| 2022/0019907 A1 * | 1/2022 | Georgopoulos | G06F 40/10 |
| 2022/0092116 A1 * | 3/2022 | Gupta | G06F 16/9024 |
| 2023/0096930 A1 * | 3/2023 | Dasdan | G06F 16/9038 715/229 |
| 2023/0229639 A1 * | 7/2023 | McCreary | G06N 5/022 707/756 |

* cited by examiner

*Primary Examiner* — Irene Baker
(74) *Attorney, Agent, or Firm* — Barta Jones, PLLC

(57) ABSTRACT

Various examples of improving an in-memory graph query engine using a persisted storage component are provided. The method includes updating data stored in an in-memory graph query engine and, based on updating the data, converting the data to a plain text form that may be more efficiently stored in the persistent storage component. The method further includes updates to additional in-memory graph query engines from the persistent storage component such that in-memory data stored in the graph query engines is synchronized.

20 Claims, 6 Drawing Sheets

MEMORY GRAPH QUERY ENGINE WITH PERSISTED STORAGE

CROSS-REFERENCE TO RELATED APPLICATION

This application is a continuation application of and claims priority to U.S. patent application Ser. No. 17/814,774, entitled "IMPROVED IN-MEMORY GRAPH QUERY ENGINE WITH PERSISTED STORAGE," filed on Jul. 25, 2022, the disclosure of which is incorporated herein by reference in its entirety.

BACKGROUND

A graph database is a type of database that stores data as nodes and relationships. Data from graph database is retrieved using a query input into a graph query engine, which retrieves the queried data from the graph database. However, querying the graph database is a high-latency operation due to the structure of the data stored in the graph database. In particular, data is stored in the graph database as a smaller, discrete item rather than a full logical entity, which is difficult to manage for a database manager. The data structure in the graph database also poses challenges when the graph database communicates with a more traditional database. Thus, an improved graph query engine with an improved storage structure is desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples and implementations disclosed herein are directed to systems and methods that improve an in-memory graph query engine using a persisted storage component. The method includes receiving, at a first in-memory graph query engine, an electronic request, processing, by the first in-memory graph query engine, the electronic request, wherein processing the electronic request includes updating in-memory data stored in the first in-memory graph query engine, converting, by first in-memory graph query engine, the updated data to a document format, outputting, by first in-memory graph query engine, the updated data in the document format to a persistent storage component, and in response to receiving, from the persistent storage component, an indication of updated data in the document format, updating in-memory data stored in a second in-memory graph query engine.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
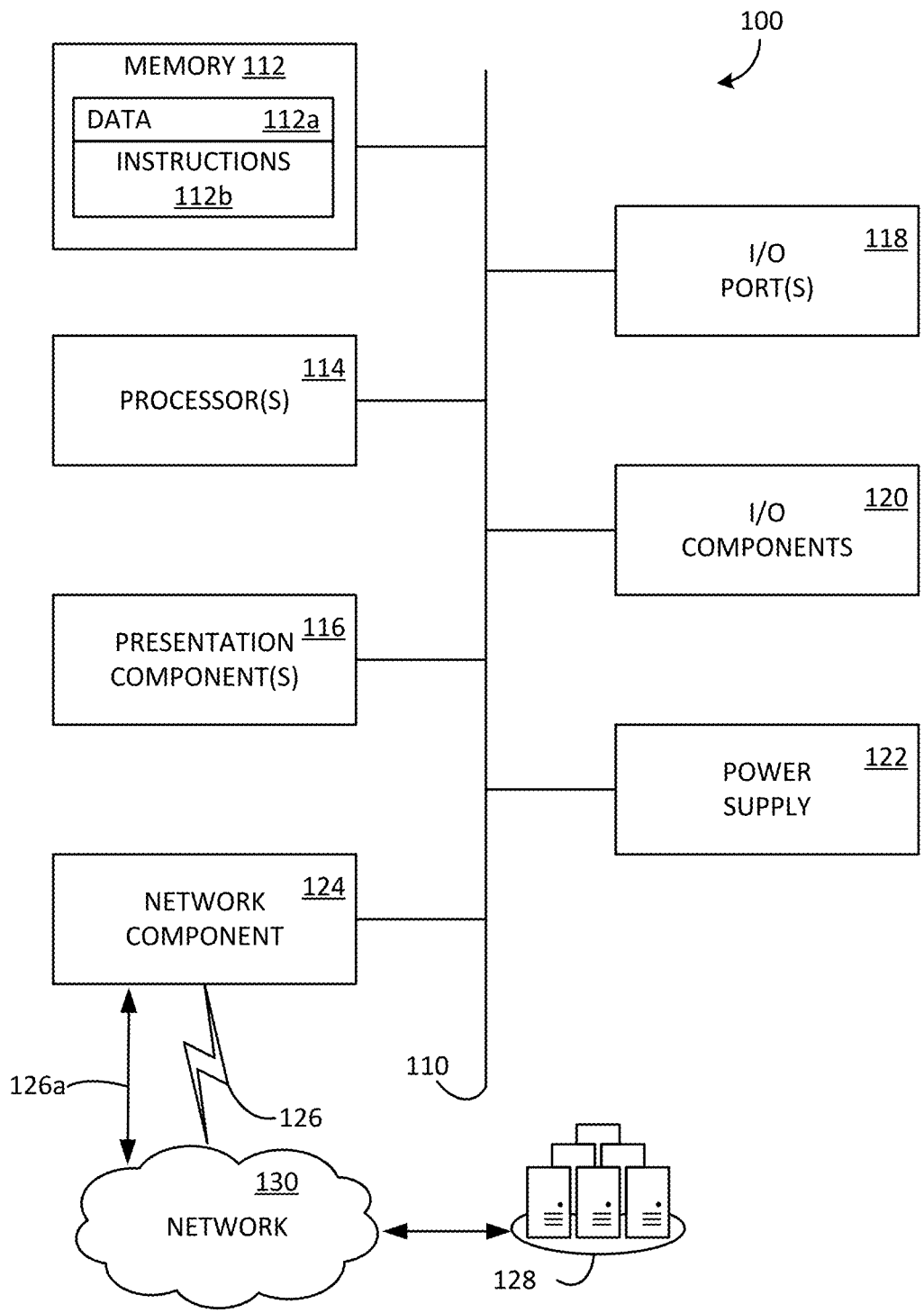
FIG. 1 is a block diagram illustrating an example computing device for implementing various examples of the present disclosure.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As described herein, graph databases are queried using a graph query engine. A graph query engine may be an application programming interface (API) compute layer that receives a query request. Graph databases are typically implemented in analytical use cases, where one or more points of interest are identified within the graph. Use cases may include, but are not limited to, fraud detection for a credit transaction, insurance claim, cab aggregation, and so forth, inventory management, customer information management, data management, community management, knowledge graphs, and supply chain management. This presents various challenges. For example, the resulting queries are large, such that existing systems are not able to effectively serve the queries. This is because existing systems require a more performant database such that a query that reaches almost all of the stored data returns results in seconds. In addition, analytical queries require higher levels of compatibility with graph query engines that presently available. Finally, the storage solution must be robust enough to handle maintenance and sudden fluctuations for computation.

The graph query engine may be able to host an entire graph onto an in-memory storage solution that provides a faster and richer graph query experience. In some examples, it may be preferable for the data stored in the graph query engine to additionally be stored in persistent storage so that in the event the in-memory instance goes down, goes offline, and so forth, the entire graph may be rehydrated as quickly as possible. However, due to the structure of the graph database, the query must be interpreted and traversal of the graph database must be negotiated in order to properly retrieve the queried data. This process may result in high-latency queries for customers.

Various aspects of the present disclosure recognize and take into account these challenges and provides an improved data format that enables the data stored in an in-memory graph store, such as a graph database, to be more effectively translated to persistent storage. Implementing these solutions provides multiple advantages. First, an in-memory storage solution that modifies one or more aspects of the graph databases so that low latency, high volume read behavior is separated from how the data is stored. This provides the advantages of a low latency, in-memory graph query engine because various key-value pairs, identified by various nodes and edges, are easily retrieved and/or updated in response to a received query. Second, the in-memory graph query engine includes a data converter that converts key-value pairs stored in the in-memory graph query engine to a more efficient data format that may be stored in the backend, such as in a persistent document storage, as documents with persistent storage native types to provide optimal or preferred storage, without disrupting the low-latency in-memory graph query engine. Third, a change feed may be maintained as the persistent document storage is updated upon receipt of updated data from the data converter. The change feed may be routed back to additional graph query engines to enable automatic indexing and continuous synchronization with both the persistent document storage and each additional graph query engine.

FIG. 1 is a block diagram illustrating an example computing device 100 for implementing aspects disclosed herein and is designated generally as computing device 100. Computing device 100 is but one example of a suitable computing environment and is not intended to suggest any limitation as to the scope of use or functionality of the examples disclosed herein. Neither should the computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Program components include routines, programs, objects, components, data structures, and the like that refer to code, performs particular tasks, or implement particular abstract data types. The disclosed examples may be practiced in a variety of system configurations, including servers, personal computers, laptops, smart phones, servers, virtual machines (VMs), mobile tablets, hand-held devices, consumer electronics, specialty computing devices, etc. The disclosed examples may also be practiced in distributed computing environments when tasks are performed by remote-processing devices that are linked through a communications network.

The computing device 100 includes a bus 110 that directly or indirectly couples the following devices: computer-storage memory 112, one or more processors 114, one or more presentation components 116, I/O ports 118, I/O components 120, a power supply 122, and a network component 124. While the computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an operating system (OS), a universal application platform, or other program modules and program data. Memory 112 is thus able to store and access data 112a and instructions 112b that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif., ANDROID™ developed by GOOGLE, INC.® of Mountain View, California, open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor 114, by multiple processors 114 within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Example presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126a across network 130 to a cloud environment 128. Various different examples of communication links 126 and 126a include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

As described herein, the computing device 100 may be implemented as one or more servers. The computing device 100 may be implemented as a system 200 or in the system 200 as described in greater detail below.

Figure 2:
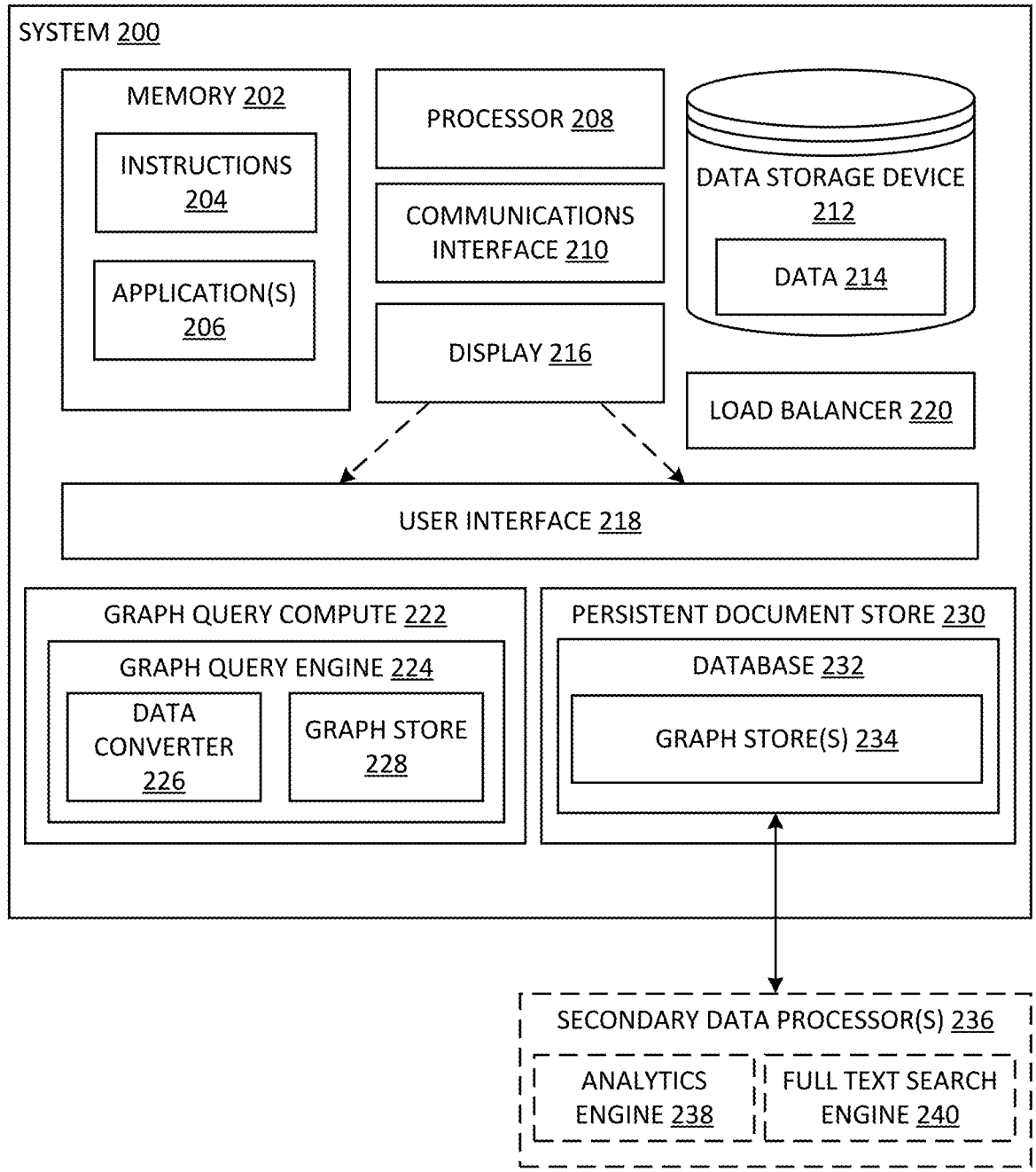
FIG. 2 is a block diagram illustrating an example system for implementing various examples of the present disclosure.

FIG. 2 is a block diagram illustrating an example system for implementing various examples of the present disclosure. The system 200 may include the computing device 100. In some implementations, the system 200 includes one or more server(s) that includes each of the components of the system 200 described herein. The system 200 is presented for illustration only and should not be construed as limited. Various examples of the system 200 are possible. For example, some elements of the system 200 may be added, omitted, and so forth without departing from the scope of the present disclosure.

The system 200 includes a memory 202, a processor 208, a communications interface 210, a data storage device 212, a display 216, and a user interface 218. The memory 202 stores instructions 2042 executed by the processor 208 to control the communications interface 210, the display 216, and the user interface 218. The memory 202 further stores data, such as one or more applications 206.

The processor 208 executes the instructions 204 stored on the memory 202 to execute various functions of the system 200. For example, the processor 208 controls the communications interface 210 to transmit and receive various signals and data, controls the data storage device 212 to store data 214, controls the user interface 218 to display one or more client-side versions of the applications 206 on the display 216, and so forth. In some implementations, the system 200 includes one or more specialized modules that are implemented on the processor 208 to perform specialized functions. For example, the system 200 may include a load balancer 220, a graph query compute 222, and a persistent document store 230.

The data storage device 212 stores data 214. The data 214 may include any d3ata, including, but not limited to, data related to the applications 206 executing on the user interface 218, enterprise data for the system 200, and so forth. In some examples, the data 214 may include data stored in a database 232, such as one or more graph stores 234, and/or data stored in the graph query compute 222.

The display 216 presents the user interface 218. In some examples, the user interface 218 may be presented on one display 216. In other examples, the user interface 218 may be presented on more than one display 216. Each display 216 may be a monitor that includes an in plane switching (IPS) liquid-crystal display (LCD), an LCD without IPS, an organic light-emitting diode (OLED) screen, or any other suitable type of display. In some implementations, the display 216 includes a touch screen such that the user interface 218 may directly receive an input, such as from a stylus or from the finger of a user of the system 200. The display 216 supports various interactions, such as panning, scrolling, zooming in, zooming out, inking, and so forth.

The load balancer 220 may be a specialized processor implemented on the processor 208 that distributes incoming application traffic across multiple targets, such as the graph query engine(s) 224. For example, the load balancer 220 may receive one or more online transaction processing (OLTP) requests and distribute the requests across the graph query engine(s) 224 such that no particular graph query engine 224 receives a number of requests that overloads the graph query engine 224. In some examples, the load balancer 220 executes one or more machine-learning (ML) algorithms in order to balance the load of incoming OLTP requests.

The graph query compute 222 may execute one or more graph query engine(s) 224. The graph query engine 224 is specialized a processor that queries a scalable graph database, such as graph database 228, containing nodes and vertices that illustrate relationships between nodes. In some examples, the graph query compute 222 is a localized server. In other examples, the graph query compute 222 is a web- or cloud-based server storing web- or cloud-based graph query engine(s) 224.

The graph query engine 224 may query the graph database 228, which includes a plurality of nodes, each of has one or more properties. A connection between nodes is referred to as edge. A node may be any type of data to be stored. For example, for a social media site, a node may be a user. An edge between the node for the user and a node for a property may represent the property is associated with the user. For example, a first node may represent the user, a second node may represent an age, a third node may represent a location, and so forth. A first edge may connect the first node and the second node and a second edge may connect the first node and the third node. Due to the first and second edges, each of the age and location are associated with the user. However, it should be understood that the example of a social media site used herein is presented for illustration only and should not be construed as limiting. Various examples of nodes and properties may be used without departing from the scope of the present disclosure. In other examples, a node may represent a recipe that has properties that define the ingredients in the recipe, a node may represent a collection of authors that has properties that define books written by authors in the collection. Accordingly, a property on a vertex is represented as a key value pair, with the key referring to the vertex identification (ID) and the schema element ID, which refers to the property name. The keys and values may be stored in binary.

As queries, such as OLTP requests, are received, the load balancer 220 distributes the queries among the graph query engine(s) 224 to execute the queries and return the desired information. In the example presented herein of a social media site, a query may be received for a location of the user associated with the first node. The load balancer 220 may receive the query, distribute the query to the appropriate graph query engine 224 based on available bandwidth of one or more of the graph query engine(s) 224, and the graph query engine 224 returns the queried information, i.e., the location of the user. In another example, a query may be received and returned to identify a list of ingredients or a particular ingredient in a recipe. In another example, a query may be received and returned to identify the title of a book written by the colleague of a particular author, given the name of particular author.

The graph query engine 224 may further include a data converter 226. The data converter 226 is a specialized processor that converts the data stored in the graph database, such as the graph database 228, to a format that can be stored and read by the persistent document store 230. While storing data in a graph database, such as the graph database 228, provides advantages such as more effectively exhibiting relationships between various properties of the data, the graph database poses challenges when being written to more persistent storage, such as the persistent document store 230. For example, the graph database 228 stores the data in a highly shredded format by splitting logical entities into smaller discrete items that become more difficult to manage at an atomic level. This may be difficult to translate to persistent storage that is entity based with more complex entities. Thus, by converting the data in the graph database to a document format, such as by a single atomic write, the data is converted in converted into a format that may be read and stored by the persistent document store 230, is readable when extracted from the persistent document store 230, and decouples the low latency, high volume read behavior of the graph database from how the data is stored in the persistent document store 230. In some examples, converting the data to a document format includes converting the data form a binary from to a plain text form.

The persistent document store 230 stores one or more databases 232. The database 232 stores one or more graph store(s) 234 that contains data of all the vertex and edge states of the graph query engine 224, but in a persistent data format. For example, the graph store(s) 234 may store the data from the graph query engine(s) 224 in a document format generated by the data converter 226, rather than as edges and vertices as stored in the graph database. By storing the data in the document format generated by the data converter 226 rather than as the edges and vertices as in the graph database 228.

In some examples, the system 200 further includes one or more secondary data processors 236. In some examples, the secondary data processor 236 is referred to herein as a handler. The secondary data processor 236 is configured to read and/or write documents that are agnostic of the graph query engine 224. In this example, the data set source of truth remains in the persistent document store 230. The secondary data processor 236 may include an analytics engine 238 and/or a full text search engine 240. The analytics engine 238 provides data analytics services such as data integration, enterprise data warehousing, and other analytics services. The full text search engine 240 is a search function that identifies and explores relevant content on a large scale.

In some examples, the secondary data processor 236 is provided as part of the persistent document store 230. In other examples, the secondary data processor 236 is provided external of the persistent document store 230, as illustrated in FIG. 2.

Figure 3:
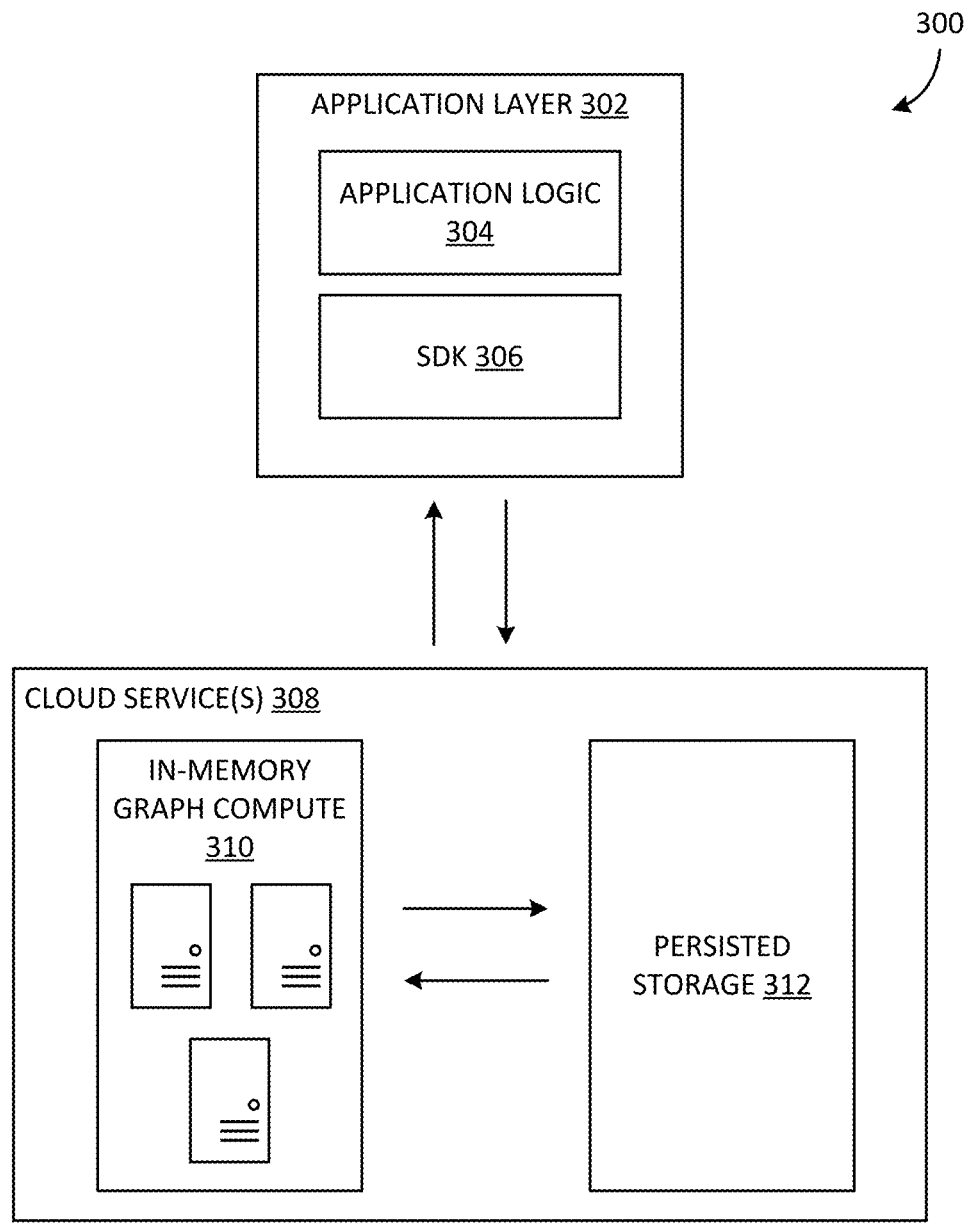
FIG. 3 is a block diagram illustrating an example system for implementing various examples of the present disclosure.

FIG. 3 is a block diagram illustrating an example system for implementing various examples of the present disclosure. The system 300 may include the one or more aspects of the system 200. The system 300 is presented for illustration only and should not be construed as limited. Various examples of the system 300 are possible. For example, some elements of the system 300 may be added, omitted, and so forth without departing from the scope of the present disclosure.

The system 300 includes an application layer 302 and cloud services 308. The application layer 302 includes application logic 304 and a software development kit (SDK) 306. The application logic 304 may be instructions that are executable to perform one or more functions of the application layer 302. The SDK 306 may be an API that is utilized to execute the application logic 304. The application layer 302 may write to the cloud service(s) 308 and/or read from the cloud service(s) 308.

The cloud service(s) 308 may include one or more cloud services including an in-memory graph compute component 310 and a persisted storage component 312. The in-memory graph compute component 310 may be the graph query compute 222. The persisted storage component 312 may be the persistent document store 230. The in-memory graph compute component 310 may write to the persisted storage component 312 and the persisted storage component 312 may write to the in-memory graph compute component 310.

Figure 4:
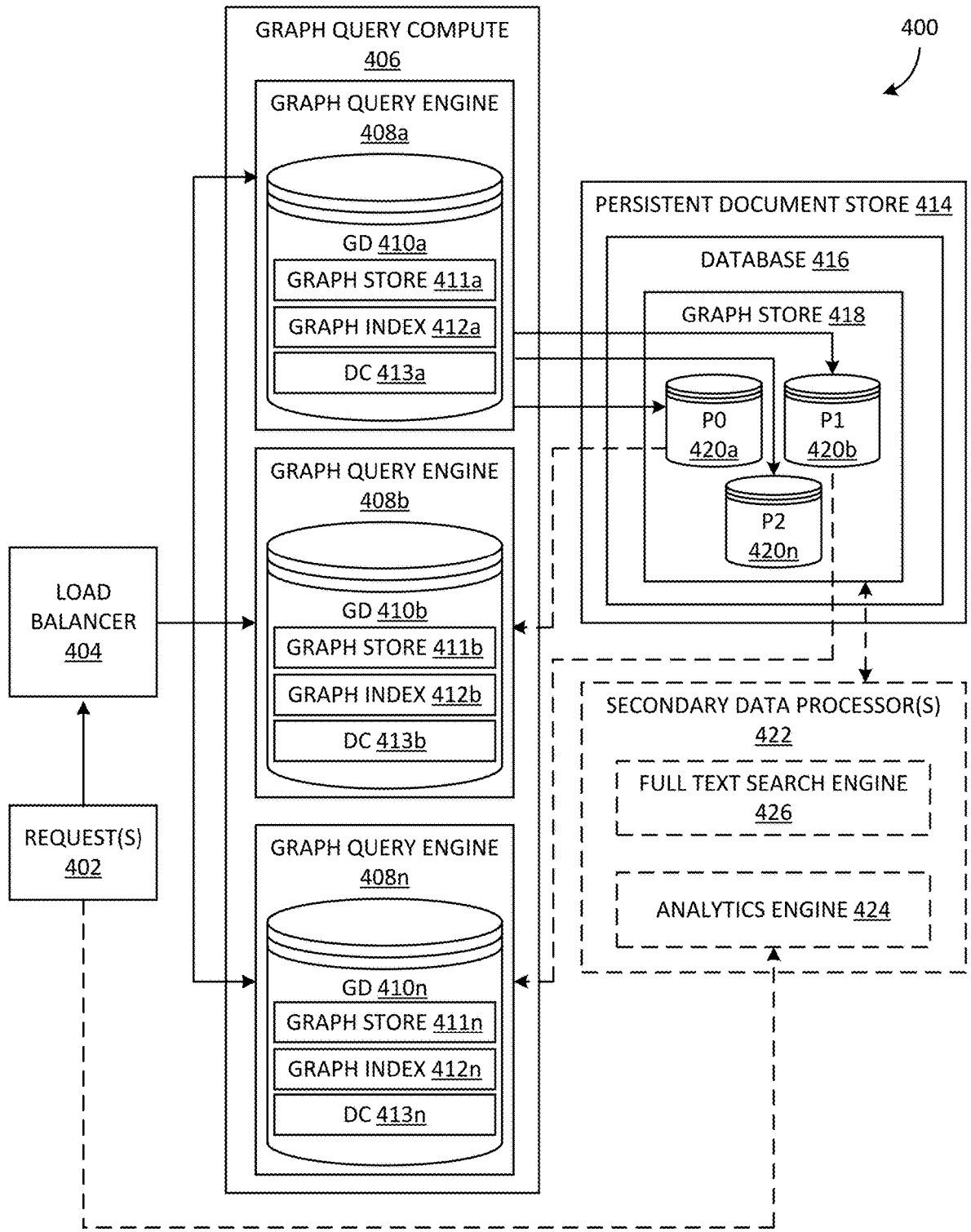
FIG. 4 is a block diagram illustrating an example system for implementing various examples of the present disclosure.

FIG. 4 is a block diagram illustrating an example system for implementing various examples of the present disclosure. The system 400 may include the one or more aspects of the system 200 and/or the system 300. The system 400 is presented for illustration only and should not be construed as limited. Various examples of the system 400 are possible. For example, some elements of the system 400 may be added, omitted, and so forth without departing from the scope of the present disclosure.

The system 400 includes a load balancer 404, a graph query compute 406, and a persistent document store 414. The load balancer 404 may be an example of the load balancer 220, the graph query compute 406 may be an example of the graph query compute 222, and the persistent document store 414 may be an example of the persistent document store 230.

The graph query compute 406 includes one or more graph query engines 408. For example, FIG. 4 illustrates a first graph query engine 408a, a second graph query engine 408b, and a third graph query engine 408n. However, various examples are possible. The graph query compute 406 may include more than three graph query engines or fewer than three graph query engines without departing from the scope of the present disclosure.

Each graph query engine 408 includes a graph database 410, which further includes a graph store 411 and a graph index 412. The graph query engine 408 may be an example of the graph query engine 224 and the graph database 410 may be an example of the graph database 228. For example, the first graph query engine 408a includes a first graph database 410a, which includes a first graph store 411a and a first graph index 412a, the second graph query engine 408b includes a second graph database 410b, which includes a second graph store 411b and a second graph index 412b, and the third graph query engine 408n includes a third graph database 410n, which includes a third graph store 411n and a third graph index 412n.

Each graph store 411 contains data including nodes and edges that connect two nodes. For example, as described herein, for a social media site, a node may be a user and an edge between the node for the user and a node for a property may represent the property is associated with the user. For example, a first node may represent the user, a second node may represent an age, a third node may represent a location, and so forth. A first edge may connect the first node and the second node and a second edge may connect the first node and the third node. Due to the first and second edges, each of the age and location are associated with the user.

In some examples, each graph store 411a, 411b, 411n are synchronized such that the data stored in each graph store 411a, 411b, 411n is the same. Thus, a request 402, such as an OLTP request, received by the load balancer 404 may be distributed to any of the graph store 411a, 411b, 411n and return the same results regardless of which graph store 411a, 411b, 411n receives the request 402.

Each graph index 412 is an in-memory index built from in-memory from the corresponding graph store 411. For example, the first graph index 412a is built from the first graph store 411a, the second graph index 412b is built from the second graph store 411b, and the third graph index 412n is built from the third graph store 411n. In some examples, the graph index 412 may not include a corresponding persisted equivalence. Each graph index 412 may be utilized for index optimization on read queries.

Each graph database 410 further includes a data converter 413. For example, the first graph database 410a includes a first data converter 413a, the second graph database 410b includes a second data converter 413b, and the third graph database 410n includes a third data converter 413n. Each data converter 413 may be an example of the data converter 226. For example, each data converter 413 may be a specialized processor that converts the data stored in the respective graph database 410 to a format that can be stored and read by the persistent document store 414. By converting the data in the respective graph database 410 to a document format, the data is converted in converted into a format that may be read and stored by the persistent document store 414, is readable when extracted from the persistent document store 414, and decouples the low latency, high volume read behavior of the graph database from how the data is stored in the persistent document store 414.

By including each of the graph store 411, the graph index 412, and the data converter 413, each graph query engine 408 provides graph query processing and memory instances. The graph query engine 408 supports graph OLTP read workloads via an in-memory store for low latency responses. In-memory entities are maintained as binary encoded blocks, either on or off heap, for efficient footprint and robust lookups that are specific to the particular graph query engine 408. The graph query engine 408 further supports persisting vertex/edge entities to the persisted document store 414 with native types of the persistent document store 414 in order to provide optimal storage and graph engine-agnostic reading and processing on the persisted state. In addition, multiple instances of the graph query engine 408, i.e., the graph query engine 408a, the graph query engine 408b, and the graph query engine 408n, may be deployed to host a copy of the same graph database or databases, which provides high-availability and read throughput scaling. For example, the load balancer 404 may receive a request 402 and distribute the request 402 to the graph query engine 408 that has the greatest availability at the time the request 402 is received.

The persistent document store 414 stores at least one database 416. The database 416 includes a graph store 418 is a persistent copy of the data stored in the graph database(s) 410. In other words, the data stored in the graph store 418 is a more persistent, or permanent, copy of the data stored in the graph database(s) 410. In some examples, the graph store 418 stores the data in a different storage format than the format in which the data is stored in the graph database(s) 410. For example, as described herein, the graph database 410 stores data as nodes and edges. In contrast, the graph store 418 may store the data in a document format that is received from the graph database 410 after being converted to the document format by the data converter 413. As described herein, the document format enables the data to be readable when extracted from the persistent document store 414 and decouples the low latency, high volume read behavior of the graph database from how the data is stored in the persistent document store 414. In other words, the data stored in the graph store 418 is agnostic to requirements of the graph query compute 406 and/or the respective graph query engines 408 so that the persistent document store 414 is compatible with additional types of databases.

The graph store 418 may be partitioned into a plurality of partitions 420. For example, the graph store 418 includes a first partition 420a, a second partition 420b, and a third partition 420n. Although illustrated in FIG. 4 as including three partitions 420, this example is presented for illustration only and should not be construed as limiting. Any number of partitions 420 may be used without departing from the scope of the present disclosure. For example, the graph store 418 may be partitioned into more or fewer than three partitions 420.

As described herein, the load balancer 404 distributes incoming application traffic across multiple targets, such as to one of the graph query engine(s) 408 included in the graph query compute 406. In one example, a particular request 402 is received by the load balancer 404 and is distributed to one of the graph query engines 408a, 408b, 408n. For example, the request 402 may be routed to the first graph query engine 408a. The first graph query engine 408a processes the request 402 based on the type of OLTP request. For example, the request 402 may be a request to retrieve information, such a such as a request to retrieve the age of a particular user of a social media site. In this example, the first graph index 412a is used to optimize the query and return the age of the particular user within the graph store 411a. The age of the particular user may be retrieved by identifying an edge of the node associated with the user that connects to another node associated with the age.

In another example, the request 402 may be a request to add a property to the user of the social media site, such as to add a birthday of the user. To process the request 402 to add the property to the user, the graph query engine 408a generates a new node associated with the new birthday property and adds a new edge to the node associated with the user in the graph store 411a. Accordingly, the new node associated with the birthday property is associated with the user. The new birthday property is then written to the persistent document store 414. To write to the persistent document store 414, the data converter 413a converts the data in the graph store 411a to the document format and transmits the updated data, in the document format, to the graph store 418. More particularly, the data converter 413a converts the data to the document format and transmits the document formatted data to each of the partitions 420 of the graph store 418. The data may be transmitted in various forms. In some examples, only the updated data is transmitted to the partitions 420. In this example, the previous iteration of the document is updated to include the newly received data. In other examples, a replacement document is transmitted to the partitions 420 that includes not only the newly added birthday for the user, but also any previously included data regarding the user such as age, location, and so forth, in this example, the previous iteration of the document is deleted from each partition 420 and replaced with the newly received document.

In another example, the request 402 may be a request to delete a property to the user of the social media site, such as to delete a location of the user. To process the request 402 to delete the property, the graph query engine 408a deletes the node associated with the property to be deleted and the edge from the deleted node to the node associated with the user. The updated data, including the removed node, is then converted by the data converter 413a to the document format and transmitted to the graph store 418. The partitions 420 of the graph store 418 update the document storage as described herein.

In another example, the request 402 may be a request to edit a property to the user of the social media site, such as the location of the user. To process the request 402 to edit the property, the graph query engine 408a edits a value associated with the node associated with the property to. The updated data, including the updated node, is then converted by the data converter 413a to the document format and transmitted to the graph store 418. The partitions 420 of the graph store 418 update the document storage as described herein.

In some examples, the changes made to data in one graph query engine 408 are propagated to the other graph query engines 408. In other words, upon the addition, deletion, or editing of the first graph store 411a as described herein, the second graph store 411b and the third graph store 411n are to also be updated to reflect the change to the first graph store 411a. Therefore, the graph query engine 408 continuously synchronizes the in-memory state with the persistent document store 414. For example, upon the partitions 420 adding, deleting, or editing the data stored in the partitions 420, each partition 420 may implement a change feed. The change feed is a persistent record, or log, of changes made to the graph store 418. The change feed may be output back to the graph query engines 408, which then made analogous changes as noted in the change feed in order to replicate changes made in other graph query engines 408. In the example(s) above where the change is made to the data in the graph store 411a and output to the graph store 418, the partitions 420a and 420b output the change feed to the second graph store 411b and the third graph store 411n so the second graph store 411b and the third graph store 411n may be updated to reflect the changes made to the first graph store 411a.

In some examples, the graph store 418 maintains a single change feed that includes changes made to data stored in the graph store 418 upon receipt of the changes from every graph query engine 408. In these examples, the single change feed may be output to each graph query engine 408. Upon receipt of the change feed, each graph query engine 408 updates its respective graph store 411 based on the changes in the change feed so the graph store 411 is regularly and continuously maintained with up to date data. In other examples, the graph store 418 maintains separate change feeds for different graph query engines 408. For example, the graph store 418 may maintain a first change feed that includes changes received from the first graph query engine 408a that are to be sent to the second graph query engine 408b and the third graph query engine 408n, a second change feed that includes changes received from the second graph query engine 408b that are to be sent to the first graph query engine 408a and the third graph query engine 408n, and a third change feed that includes changes received from the third graph query engine 408n that are to be sent to the first graph query engine 408a and the second graph query engine 408b.

In some examples, the system 400 further includes one or more secondary data processors, or handlers, 422. The secondary data processor 422 may be an example of the secondary data processor 236. The secondary data processor 422 is configured to read and/or write documents that are agnostic of the graph query engine(s) 408. In this example, the data set source of truth remains in the persistent document store 414. The secondary data processor 422 may include an analytics engine 424 and/or a full text search engine 426. The analytics engine 424 may receive requests 402 and provide data analytics services such as data integration, enterprise data warehousing, and other analytics services. The full text search engine 426 is a search function that identifies and explores relevant content on a large scale.

In some examples, the secondary data processor 422 may read and/or write documents directly to and from, respectively, the graph store 418. In some examples, the secondary data processor 422 may receive the request 402 directly, rather than the request being processed by the load balancer 404 and being routed to a graph query engine 408.

Figure 5:
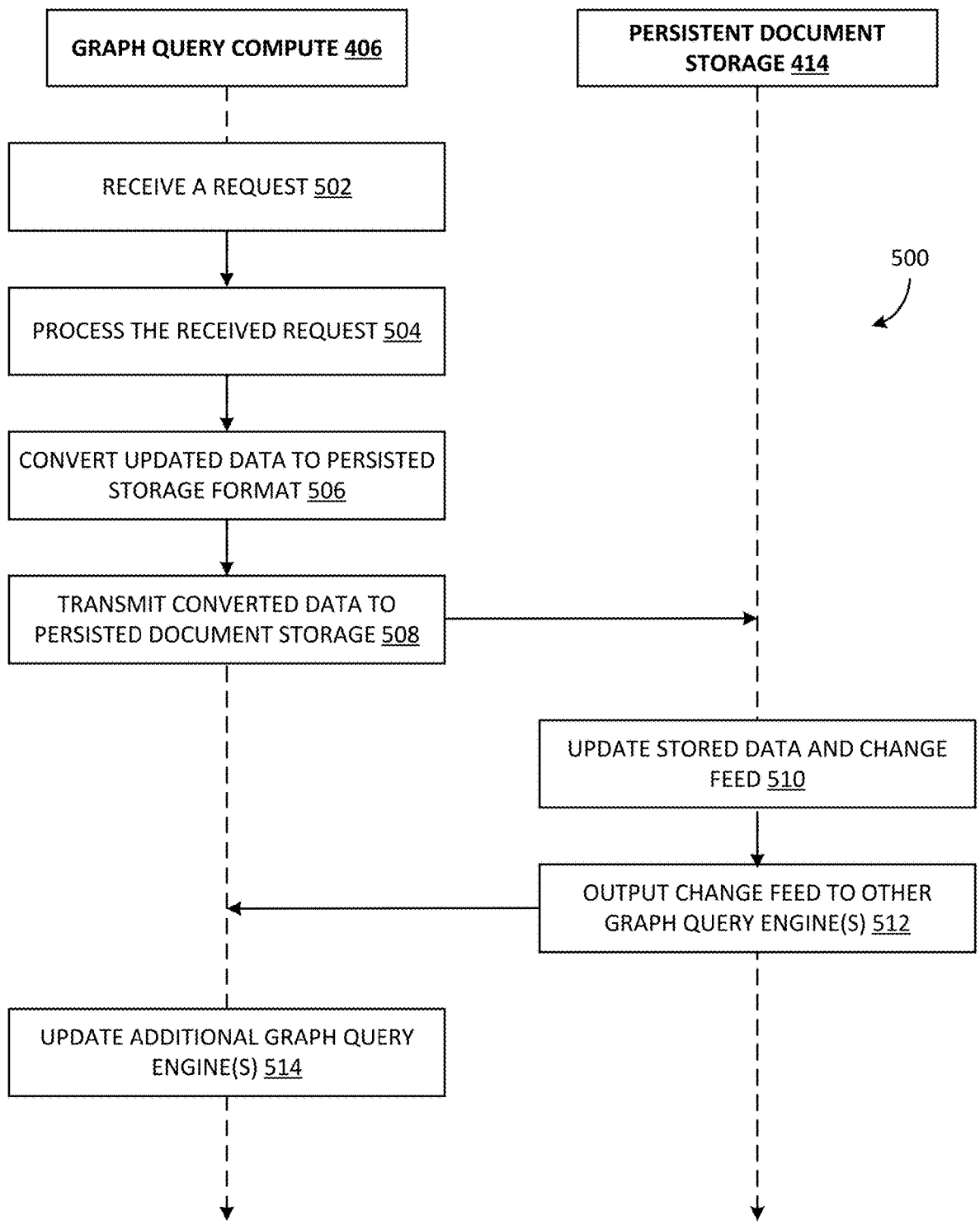
FIG. 5 is a flow chart illustrating a computer-implemented method of updating an in-memory graph query engine and persisted storage according to various examples of the present disclosure.

FIG. 5 is a flow chart illustrating a computer-implemented method of updating an in-memory graph query engine and persisted storage according to various examples of the present disclosure. The computer-implemented method 500 illustrated in FIG. 5 is presented for illustration only and should not be construed as limiting. Various operations may be added to the computer-implemented method 500, omitted from the computer-implemented method 500, performed in a different order, and so forth without departing from the scope of the present disclosure. The computer-implemented method 500 may be performed by various components of the system 200, the system 300, and/or the system 400, for example the graph query compute 406 and the persistent document store 414.

The computer-implemented method 500 begins by the graph query compute 406 receiving a request in operation 502. In some examples, the request is an electronic request 402, such as an OLTP request, received from a load balancer 404. The graph query compute 406 may receive the request 402 at a particular graph query engine 408, such as the first graph query engine 408a, based on the load balancer 404 determining the first graph query engine 408a has the greatest amount of available bandwidth at the time the request 402 was received.

In operation 504, the first graph query engine 408a processes the received request 402 based on the type of request that is received. As described herein, the request may be to retrieve data from the first graph query engine 408a, add data to the first graph query engine 408a, update data stored in the first graph query engine 408a, delete data stored in the first graph query engine 408a, and so forth. For example, where the request 402 is a request to add data to the first graph query engine 408a, the first graph query engine 408a adds the new data by adding at least one new node and at least one new edge between nodes as a key-value pair. In some examples, processing the received request further includes outputting a confirmation that the request has been successfully processed.

In operation 506, the first graph query engine 408a converts the updated data to a persisted storage format so the updated key-value pair may be stored in the persisted document store 414. In some examples, the first data converter 413a converts the updated data from a binary form, such as the key-value pair, to a plain text form, which can be stored as a document format in the persistent document store 414.

In operation 508, the first graph query engine 408a transmits the converted data, i.e., the data in the plain text form, to the persisted document store 414. The persisted document storage receives the updated data in the plain text form and in operation 510, updates its stored data and a change feed. The change feed is a persistent record, or log, of changes made to the graph store 418.

In operation 512, the persisted document store 414 outputs the change feed to any additional graph query engine(s) 408 in the graph query compute 406. For example, the persisted document store 414 may output the change feed to each graph query engine 408 so that each graph query engine 408 may update its respective graph store 411 based on the changes in the change feed. In another example, the persisted document store 414 may maintain separate change feeds for each graph query engine 408 so that a particular graph query engine 408 does not receive changes that have already been made.

In some examples, the change feed is output to one or more of the graph query engines 408 at a regular interval, such as every second, every five seconds, every ten seconds, and so forth. In other examples, the change feed is output to one or more of the graph query engines 408 each time a change to the change feed is detected. For example, the change feed may be updated each time a new change to data stored in the persistent document store 414 is detected, triggering an output of the change feed to one or more of the graph query engines 408. In other examples, the change feed may be output to one or more of the graph query engines 408 upon a threshold number of changes to the change feed being reached. For example, the change feed may be output each time three new changes to the change feed are detected, each time five new changes to the change feed are detected, and so forth.

In operation 514, each additional graph query engine 408 updates its respective graph store 411 to reflect data that is updated in other graph query engines 408. For example, where an initial update is made to the first graph query engine 408a, in operation 514 the second graph query engine 408b and the third graph query engine 408n update the second graph store 411b and the third graph store 411n, respectively, to reflect the updates to the first graph store 411a. Accordingly, each the graph store 411 is synchronized with additional graph stores 411 to be regularly and continuously maintained with up to date data.

Figure 6:
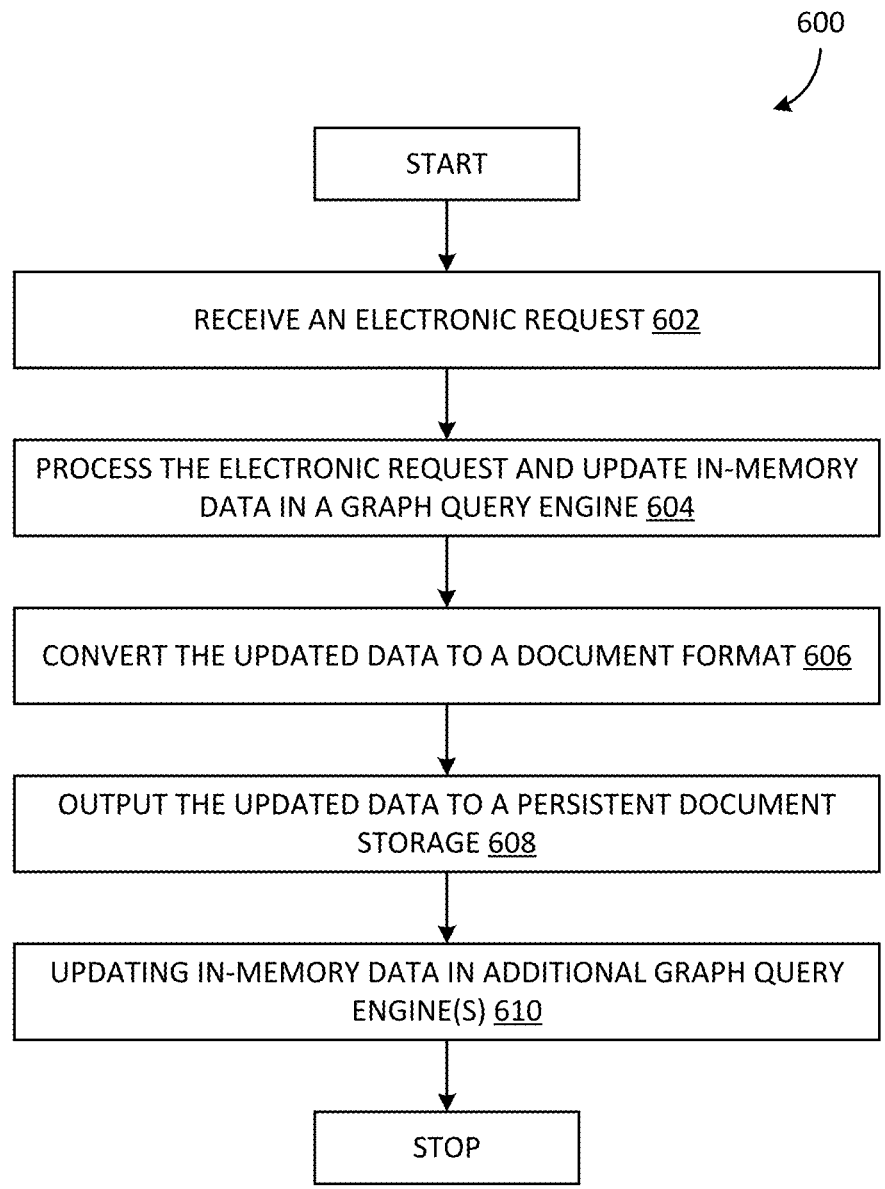
FIG. 6 is a flow chart illustrating a computer-implemented method of updating an in-memory graph query engine and persisted storage according to various examples of the present disclosure.

FIG. 6 is a flow chart illustrating a computer-implemented method of updating an in-memory graph query engine and persisted storage according to various examples of the present disclosure. The computer-implemented method 600 illustrated in FIG. 6 is presented for illustration only and should not be construed as limiting. Various operations may be added to the computer-implemented method 600, omitted from the computer-implemented method 600, performed in a different order, and so forth without departing from the scope of the present disclosure. The computer-implemented method 600 may be performed by various components of the system 200, the system 300, and/or the system 400, for example the load balancer 404, the graph query compute 406, and the persistent document store 414.

The computer-implemented method 600 begins by the first graph query engine 408a receiving an electronic request in operation 602. The electronic request may be an example of the request 402. In some examples, the request is received from a load balancer 404 and routed to the first graph query engine 408a based on the load balancer 404 determining the first graph query engine 408a has the greatest bandwidth available to process the received request 402 than other graph query engines.

In operation 604, the first graph query engine 408a processes the received request 402 and updates the in-memory data stored in the first graph store 411a. For example, the first graph query engine 408a may add a key-value pair to the first graph store 411a where the electronic request 402 is to add new data, update a key-value pair in the first graph store 411a where the electronic request 402 is to update stored data, or delete a key-value pair from the first graph store 411a where the electronic request 402 is to remove stored data.

In operation 606, the first data converter 413a, implemented on the first graph query engine 408a, converts the updated data to a document format. For example, the first data converter 413a may convert the in-memory stored data from a binary form, stored in the first graph store 411a, to a plain text form that may be stored on a persistent document component, such as the persistent document store 414.

In operation 608, the first graph query engine 408a outputs the converted data to the persistent document store 414. The converted data, i.e., the updated data that has been converted to the plain text form, is received by the persistent document store 414. The persistent document store 414 maintains a persistent version of the in-memory data stored in the graph query compute 406, including each graph store 411. In some examples, the first graph query engine 408a outputs the converted data to at least two partitions in the persistent document store 414, selected from the first partition 420a, the second partition 420b, and the third partition 420n in the graph store 418.

In some examples, the persistent document store 414 updates the graph store 418 to reflect the updated data received in the plain text form from the first graph query engine 408a. In some examples, the persistent document store 414 further maintains a change feed that includes all the changes made to the persistent document store 414 based on updated data received from one or more of the graph query engine(s) 408. The change feed may be output to one or more of the graph query engine(s) to continuously synchronize the graph stores 411 of the respective graph query engines 408.

In operation 610, in response to receiving an indication of updated data in the change feed, the second graph query engine 408b updates in-memory data stored in the second graph store 411b. For example, the indication of updated data in the change feed indicates that data in another graph query engine 408 has been updated, and the second graph query engine 408b makes the same update to the data stored in the second graph store 411b to maintain consistency with the first graph query engine 408a.

Additional Examples

Some examples herein are directed to a computer-implemented method of improving an in-memory graph query engine using a persisted storage component. The computer-implemented method (600) includes receiving (602), at a first in-memory graph query engine (408a), an electronic request (402), processing (604), by the first in-memory graph query engine, the electronic request, wherein processing the electronic request includes updating in-memory data stored in the first in-memory graph query engine, converting (606), by first in-memory graph query engine, the updated data to a document format, outputting (608), by first in-memory graph query engine, the updated data in the document format to a persistent storage component (414), and in response to receiving, from the persistent storage component, an indication of updated data in the document format, updating (610) in-memory data stored in a second in-memory graph query engine (408b).

In some examples, a graph query compute (406) includes the first in-memory graph query engine and the second in-memory graph query engine.

In some examples, updating the in-memory data stored in the first in-memory graph query engine includes one or more of adding a key-value pair to the first in-memory graph query engine, updating a key-value pair in the first in-memory graph query engine, and deleting a key-value pair from the first in-memory graph query engine.

In some examples, converting the updated data to the document format further comprises converting, by a data converter (413a) implemented on the first in-memory graph query engine, the in-memory data stored in the first in-memory graph query engine from a binary form to a plain text form.

In some examples, outputting the updated data to the persistent storage component includes outputting the updated data to at least two partitions in the persistent storage component.

In some examples, the computer-implemented method further includes receiving, by a load balancer (404), the electronic request and routing the received request to the first in-memory graph query engine based on determining the first in-memory graph query engine has greater bandwidth to process the received request than the second in-memory graph query engine.

In some examples, receiving the indication of the updated data includes receiving, by the second in-memory graph query engine from the persistent storage component, a change feed that comprises at least the changes included in the update of the in-memory data stored in the first in-memory graph query engine.

In some examples, outputting the data to the persistent storage component includes outputting the updated data to at least two partitions in the persistent storage component.

Although described in connection with an example computing device 100 and system 200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, servers, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A computer-implemented method, comprising:
   receiving, at a first in-memory graph query engine, an electronic request;
   processing, by a first in-memory graph query engine, the received electronic request resulting in modified in-memory data, wherein processing the electronic request comprises:
   based on the electronic request being a request to add data to the first in-memory graph query engine, adding a new node and a new edge between nodes as a key-value pair, the key representing a vertex identifier and a schema element identifier that represents a property name of a node;
   based on the electronic request being a request to update data stored in the first in-memory graph query engine, updating a key-value pair in the first in-memory graph query engine;
   based on the electronic request being a request to remove data stored in the first in-memory graph query engine, deleting a key-value pair from the first in-memory graph query engine;
   based on processing the received electronic request, converting, by a data converter of the first in-memory graph query engine, the modified in-memory data to a document format, the data converter being configured to convert key-value pairs stored in the first in-memory graph query engine, to a document format with native types of a persistent storage; and
   outputting the modified in-memory data in the document format to the persistent storage.

2. The computer-implemented method of claim 1, further comprising reading or writing, by a secondary data processor, documents stored in the persistent storage that are agnostic of the first in-memory graph query engine.

3. The computer-implemented method of claim 1, wherein the persistent storage contains data of all vertex and edge states of the first in-memory graph query engine in the document format.

4. The computer-implemented method of claim 1, wherein the electronic request is an online transaction processing (OLTP) request.

5. The computer-implemented method of claim 1, wherein converting the key-value pair to a document format occurs by a single atomic write.

6. The computer-implemented method of claim 1, further comprising:
    executing, by a load balancer, a machine learning algorithm to balance the electronic request to the first in-memory graph query engine of a plurality of in-memory graph query engines, the load balancer being configured to distribute requests across the plurality of in-memory graph query engines such that no particular graph query engine receives a number of requests that overloads that graph query engine; and
    distributing, by the load balancer, the electronic request to the first in-memory graph query engine.

7. The computer-implemented method of claim 6, further comprising:
    maintaining, by the persistent storage, a change feed, wherein the change feed is a record of changes made to data stored in the persistent storage;
    detecting a new change to the data stored in the persistent storage;
    updating, by the persistent storage, the change feed based on the converted in-memory data from the first in-memory graph query engine; and
    outputting the updated change feed to a second in-memory graph query engine of the plurality of in-memory graph query engines.

8. A computer-implemented method, comprising:
    causing a first in-memory graph query engine to:
        receive an electronic request;
        process the received electronic request resulting in modified in-memory data, wherein processing the electronic request includes:
            based on the electronic request being a request to add data to the first in-memory graph query engine, adding a new node and a new edge between nodes as a key-value pair, the key representing a vertex identifier and a schema element identifier that represents a property name of a node;
            based on the electronic request being a request to update data stored in the first in-memory graph query engine, updating a key-value pair in the first in-memory graph query engine;
            based on the electronic request being a request to remove data stored in the first in-memory graph query engine, deleting a key-value pair from the first in-memory graph query engine;
        convert, by a data converter, the modified in-memory data to a document format, the data converter being configured to convert key-value pairs stored in the first in-memory graph query engine, to a document format with native types of a persistent storage;
        output the converted in-memory data in the document format to the persistent storage; and
    updating persistent storage data at the persistent storage with the converted in-memory data in the document format.

9. The computer-implemented method of claim 8, further comprising:
    causing a secondary data processor to read or write documents stored in the persistent storage that are agnostic of the first in-memory graph query engine.

10. The computer-implemented method of claim 8, wherein the persistent storage contains data of all vertex and edge states of the first in-memory graph query engine in the document format.

11. The computer-implemented method of claim 8, wherein the electronic request is an online transaction processing (OLTP) request.

12. The computer-implemented method of claim 8, wherein converting the key-value pair to a document format occurs by a single atomic write.

13. The computer-implemented method of claim 8, further comprising:
    causing a load balancer to:
        execute a machine learning algorithm to balance the electronic request to the first in-memory graph query engine of a plurality of in-memory graph query engines, the load balancer being configured to distribute requests across the plurality of in-memory graph query engines such that no particular graph query engine receives a number of requests that overloads that graph query engine; and
        distribute the electronic request to the first in-memory graph query engine.

14. The computer-implemented method of claim 13, further comprising:
    maintaining, by the persistent storage, a change feed, wherein the change feed is a record of changes made to the persistent storage data;
    detecting a new change to the persistent storage data at the persistent storage;
    updating, by the persistent storage, the change feed based on the converted in-memory data from the first in-memory graph query engine; and
    outputting the updated change feed to a second in-memory graph query engine of the plurality of in-memory graph query engines.

15. A computer-readable storage medium storing instructions that, when executed by a processor, cause the processor to:
    receive, at a first in-memory graph query engine, an electronic request;
    process, by a first in-memory graph query engine, the received electronic request resulting in modified in-memory data, wherein processing the electronic request comprises:
        based on the electronic request being a request to add data to the first in-memory graph query engine, adding a new node and a new edge between nodes as a key-value pair, the key representing a vertex identifier and a schema element identifier that represents a property name of a node;
        based on the electronic request being a request to update data stored in the first in-memory graph query engine, updating a key-value pair in the first in-memory graph query engine;
        based on the electronic request being a request to remove data stored in the first in-memory graph query engine, deleting a key-value pair from the first in-memory graph query engine;
    based on processing the received electronic request, convert, by a data converter of the first in-memory graph query engine, the modified in-memory data to a document format, the data converter being configured to convert key-value pairs stored in the first in-memory graph query engine, to a document format with native types of a persistent storage; and output the modified in-memory data in the document format to the persistent storage.

16. The computer-readable storage medium of claim 15, further storing instructions to read or write, by a secondary data processor, documents stored in the persistent storage that are agnostic of the first in-memory graph query engine.

17. The computer-readable storage medium of claim 15, wherein the persistent storage contains data of all vertex and edge states of the first in-memory graph query engine in the document format.

18. The computer-readable storage medium of claim 15, wherein converting the key-value pair to a document format occurs by a single atomic write.

19. The computer-readable storage medium of claim 15, further storing instructions that, when executed by the processor, further cause the processor to:

execute, by a load balancer, a machine learning algorithm to balance the electronic request to a first in-memory graph query engine of a plurality of in-memory graph query engines, the load balancer being configured to distribute requests across the plurality of in-memory graph query engines such that no particular graph query engine receives a number of requests that overloads that graph query engine; and distribute, by the load balancer, the electronic request to the first in-memory graph query engine.

20. The computer-readable storage medium of claim 19, further storing instructions that, when executed by the processor, further cause the processor to:

maintain, by the persistent storage, a change feed, wherein the change feed is a record of changes made to data stored in the persistent storage;

detect a new change to the data stored in the persistent storage;

update, by the persistent storage, the change feed based on the converted in-memory data from the first in-memory graph query engine; and output the updated change feed to a second in-memory graph query engine of the plurality of in-memory graph query engines.

\* \* \* \* \*